(12) United States Patent  
Vaughn, Jr.

(10) Patent No.: US 9,428,121 B2  
(45) Date of Patent: Aug. 30, 2016

(54) ACOUSTIC WHEEL WELL LINER

(71) Applicant: Techstyles, Inc., Bingham Farms, MI (US)

(72) Inventor: William H. Vaughn, Jr., Northville, MI (US)

(73) Assignee: TECHSTYLES, INC., Bingham Farms, MI (US)

(*) Notice: Subject to any disclaimer, the term of this patent is extended or adjusted under 35 U.S.C. 154(b) by 0 days.

(21) Appl. No.: 14/641,904

(22) Filed: Mar. 9, 2015

(65) Prior Publication Data  
US 2015/0175093 A1 Jun. 25, 2015

Related U.S. Application Data

(63) Continuation-in-part of application No. 13/688,253, filed on Nov. 29, 2012, now Pat. No. 8,973,981.

(51) Int. Cl.  
B60R 13/08 (2006.01)  
B29C 69/00 (2006.01)  
B29L 31/30 (2006.01)

(52) U.S. Cl.  
CPC .......... B60R 13/0861 (2013.01); B29C 69/00 (2013.01); B29L 2031/3005 (2013.01)

(58) Field of Classification Search  
CPC .... B62D 25/161; B62D 25/18; B62D 25/16; B62D 29/043; B62D 25/163; B62D 25/188; B32B 2307/102; B32B 3/30; B32B 5/26; B32B 2038/047; B32B 37/153; B32B 38/04; B32B 38/12; B60R 13/0861; B60R 13/083; B60R 13/0815  
USPC ......... 296/198, 39.3, 146.7, 211, 37.1, 39.1; 280/851, 847, 154, 848, 160, 770; 180/290, 293, 204, 294, 286, 207, 210, 180/284, 288, 292  
See application file for complete search history.

(56) References Cited

U.S. PATENT DOCUMENTS

| | | | |
|---|---|---|---|
| 1,704,048 A | 3/1929 | Jordan | |
| 2,542,428 A | 2/1951 | Peik | |
| 4,427,208 A * | 1/1984 | Jurges | B62D 25/168 280/848 |
| 4,735,427 A | 4/1988 | Fuchs | |
| 5,280,960 A | 1/1994 | Casey | |
| 5,493,081 A * | 2/1996 | Manigold | G10K 11/168 181/286 |
| 5,573,686 A * | 11/1996 | Lavicska | B62D 25/18 219/202 |
| 5,839,761 A | 11/1998 | Dodt | |
| 5,851,626 A | 12/1998 | McCorry et al. | |
| 6,086,104 A | 7/2000 | Marchisio et al. | |
| 6,155,624 A | 12/2000 | Bienenstein, Jr. | |
| 6,799,782 B2 | 10/2004 | Jain et al. | |
| 6,953,205 B2 | 10/2005 | Friest et al. | |
| 7,011,181 B2 | 3/2006 | Albin, Jr. | |
| 7,182,172 B2 | 2/2007 | Albin, Jr. | |
| 7,419,188 B2 | 9/2008 | Nicolai et al. | |
| 7,448,468 B2 | 11/2008 | Czerny et al. | |
| 7,497,509 B2 | 3/2009 | Omiya et al. | |

(Continued)

Primary Examiner — Glenn Dayoan  
Assistant Examiner — Sunsurraye Westbrook  
(74) Attorney, Agent, or Firm — Dickinson Wright PLLC

(57) ABSTRACT

A wheel well liner for use in the wheel well of motor vehicles has inner and outer surfaces each defining one or more acoustical sections. Each acoustical section includes a pattern of irregular or convoluted portions configured and arranged to absorb/attenuation sound. A layer of flock material is deposited on the inner surface of the wheel well liner to enhance aesthetics and provide supplemental sound attenuation.

18 Claims, 8 Drawing Sheets

(56) References Cited

U.S. PATENT DOCUMENTS

| | | |
|---|---|---|
| 7,810,828 B2 | 10/2010 | Sugiyama et al. |
| 7,909,392 B2 * | 3/2011 | Takeuchi ............. B62D 25/161 |
| | | 280/850 |
| 8,146,987 B2 | 4/2012 | Uchino |
| 8,230,969 B2 | 7/2012 | Frederick et al. |
| 2005/0006173 A1 | 1/2005 | Albin, Jr. |
| 2006/0124387 A1 | 6/2006 | Berbner et al. |
| 2006/0214474 A1 * | 9/2006 | Omiya ................ B60R 13/0861 |
| | | 296/198 |
| 2008/0231082 A1 * | 9/2008 | Mathew ............... B62D 25/161 |
| | | 296/198 |
| 2010/0078927 A1 | 4/2010 | Takeuchi |
| 2011/0284319 A1 | 11/2011 | Frederick et al. |

\* cited by examiner

ACOUSTIC WHEEL WELL LINER

CROSS-REFERENCE TO RELATED APPLICATIONS

This application is a continuation-in-part of U.S. patent application Ser. No. 13/688,253 filed Nov. 29, 2012. The entire disclosure of the above application is incorporated herein by reference.

FIELD

The present disclosure relates to wheel well liners for motor vehicles and, more particularly, to acoustic wheel well liners configured to absorb and attenuate sound and vibration.

BACKGROUND

This section provides background information related to the present disclosure which is not necessarily prior art.

Many motor vehicles are now equipped with a liner inside each of the wheel wells, commonly referred to as wheel well liners, and which function to limit ingress of moisture and debris into the vehicle. Most wheel well liners are injection molded of a polymeric material and typically include fasteners for securing the liner within the wheel well of the vehicle. An exemplary construction for such a wheel well liner is disclosed in U.S. Pat. No. 6,155,624 to Bienenstein.

Wheel well liners must be a relatively rigid component to maintain structural integrity and withstand the impact of debris thrown by the wheels during motive operation of the vehicle. In addition, it is desirable that such wheel well liners attenuate road noise and the sound of debris impacting the rigid structure. Examples of wheel well liners having sound attenuating features are disclosed in the U.S. Pat. No. 4,735,427 to Fuchs and U.S. Publication No. US2008/0231082 to Boney.

In view of increased consumer demand for vehicles with improved sound attenuation, a need exists to develop wheel well liners with enhance acoustical properties.

SUMMARY

This section provides a general summary of the disclosure and is not a comprehensive disclosure of its full scope or all of its aspect, objectives, features and advantages.

In accordance with one aspect of the present disclosure, an acoustic wheel well liner for use in the wheel well of a motor vehicle is disclosed. The acoustic wheel well liner is fabricated from a polymeric material and includes one or more distinct acoustical sections configured and arranged to provide optimized sound attenuation properties.

In accordance with a related aspect of the present disclosure, the acoustical sections are formed to extend from at least one inner surface of the acoustic wheel well liner.

In accordance with another related aspect of the present disclosure, the acoustic wheel well liner includes a main body portion having an inner surface facing a wheel mounted in the wheel well of the motor vehicle. The inner surface of the main body portion includes at least one acoustical section presenting a non-planar surface profile configured to attenuate sound transmitted through the wheel well into the vehicle.

In accordance with another aspect of the present disclosure, the acoustic wheel well liner includes a layer of a textile material applied to the inner surface for enhancing the appearance and providing additional sound attenuation.

In accordance with a related aspect of the present disclosure, the layer of textile material is provided by depositing small fiber particles onto the inner surface of the acoustic wheel well liner. In accordance with an alternative aspect, the layer of textile material is a film or sheet of textile material laid in a mold prior to molding of the polymeric material into the acoustic wheel well liner.

The acoustic wheel well liner of the present disclosure can be fabricated using a molding process such as injection molding or compression molding to include at least one of a variable wall thickness and a uniform wall thickness in the acoustical sections.

Further areas of applicability will become apparent from the description provided herein. The description and specific examples in this summary are intended for purposes of illustration only and are not intended to limit the scope of the present disclosure. Additional benefits and advantages of the present disclosure will become apparent to those skilled in the art to which this invention relates from reading the following detailed description and the appended claims, taken in conjunction with the accompanying drawings.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
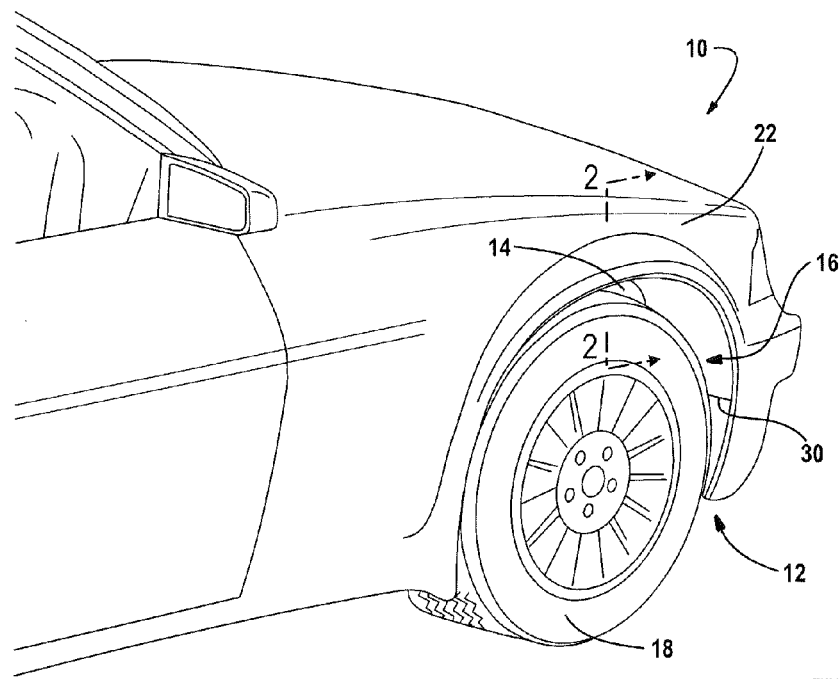
FIG. 1 is a perspective view of a portion of a motor vehicle equipped with an acoustic wheel well liner constructed in accordance with the teachings of the present disclosure.

Exemplary embodiments will now be described more fully with reference to the accompanying drawings. The exemplary embodiments are provided so that this disclosure will be thorough and fully convey the scope of the present teachings to those who are skilled in the art. In particular, numerous specific details are set forth such as examples of specific components, devices, and methods to provide a thorough understanding of embodiments of the present disclosure. However, it will be apparent to those skilled in the art that some specific details need not be employed, that some of the exemplary embodiments may be embodied in different forms, and that neither should be construed to limit the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In general, the present disclosure is directed to wheel well liners adapted for installation in the wheel housing or wheel well of a motor vehicle. More specifically, the wheel well liners of the present disclosure are configured and arranged to include an inner surface having one or more acoustical sections with a convoluted sound attenuating surface profile. The profiles of the convoluted sound attenuating surfaces are formed during fabrication of the acoustic wheel well liner and preferably via an injection molding process, a back forming process, or a compression sheet forming process utilizing a polymeric material. The polymeric material is selected to withstand the environmental conditions experienced within the wheel well of the motor vehicle. Specifically, the polymeric material is selected to withstand the impact of debris while inhibiting the ingress of moisture, mud and debris into other portions of the motor vehicle. Portions of the inner surface of the liners, particularly the acoustical sections, may be flocked to deposit small fiber (i.e., textile) particles thereon in effort to provide enhanced sound attenuation and/or damping while also providing improved aesthetics. Alternatively, a layer, film or sheet of textile material may be bonded or laminated to the inner surface during forming of the acoustic wheel well liners.

With initial reference to FIG. 1 of the drawings, a portion of a motor vehicle 10 is shown. Motor vehicle 10 is generally shown as a passenger-type automobile. However, those skilled in the art will appreciate that motor vehicle 10 can be any other type of vehicle known in the art. A front passenger-side portion 12 of vehicle 10 is shown and which defines a right front wheel well 14 within which a wheel well liner 16 constructed in accordance with the present teachings is installed. A wheel 18 is disposed in wheel well 14. Liner 16 is configured and arranged to inhibit moisture and debris from being thrown off of wheel 18 into other internal portions of vehicle 10. As will be detailed, liner 16 is installed between a wheel well housing 20 and an exterior fender panel 22 which together define and delineate wheel well 14.

Figure 3:
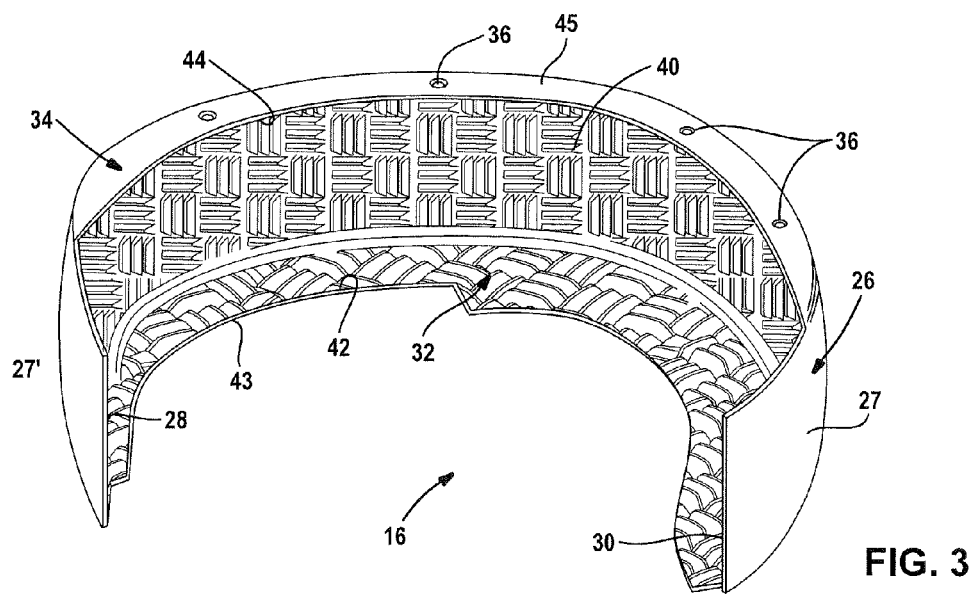
FIG. 3 is a perspective view of the acoustic wheel well liner formed to include a plurality of acoustical sections in accordance with the present disclosure.
Figure 2:
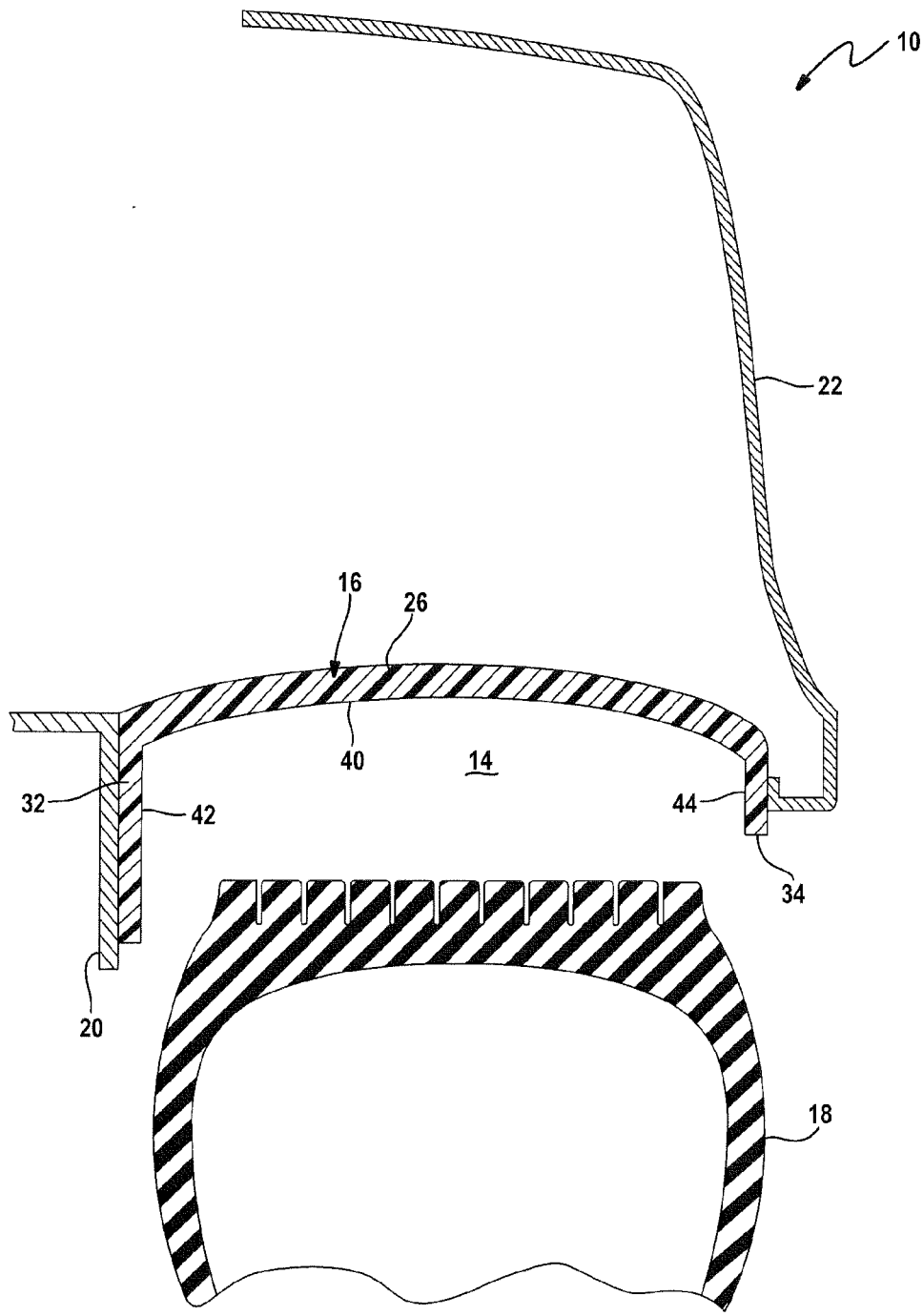
FIG. 2 is a sectional view of the motor vehicle shown in FIG. 1, taken generally along line 2-2 thereof.

Liner 16 is shown prior to assembly into wheel well 14 of vehicle in FIG. 3 and in a partial sectional view in FIG. 2. Liner 16 may include a main body portion 26 terminating at end sections 28 and 30, and a pair of longitudinal inner and outer side flange portions 32 and 34 extending from main body portion 26 at least partially toward end sections 28 and 30. Liner 16 has an overall generally arcuate shape that is configured for attachment within wheel well 14. In particular, outer side flange 34 is adapted to engage and be secured to fender panel 22 while inner side flange 32 is adapted to engage and be secured to wheel housing 20. While the curvature of wheel well 14 is not constant, its arcuate shape generally conforms to a half-circle and facilitates installation of liner 16 radially outward from wheel 18.

Liner 16 is generally fabricated from a polymeric material. Polymers such as polypropylene or high-density polyethylene may be used for liner 16. However, those skilled in the art appreciate that other impact resistant materials can be used to fabricate line 16. Liner 16 may be injection molded to define a closed cell impermeable structure that provides the requisite rigidity and impact resistance and yet provides sufficient flexibility to permit installation of liner 16 into wheel well 14. As an alternative, liner 16 may be fabricated from a sheet of polymeric material, for example, via a compression sheet molding process. Liner 16 may include a plurality of mounting apertures 36 extending through one or more of radially extending side flange portions 32, 34 for securing liner 16 within wheel well 14 using suitable fasteners. Alternatively, it will be understood that apertures 36 may be eliminated in favor of attachment of liner 16 within wheel well 14 using other fastening techniques including, for example, self-tapping screws, push pins and/or rivets. Furthermore, fasteners may be integrally molded, or secured during the molding process, to one of the liner's 16 surfaces, thereby defining a wheel well liner with fasteners extending therefrom.

Figure 4:
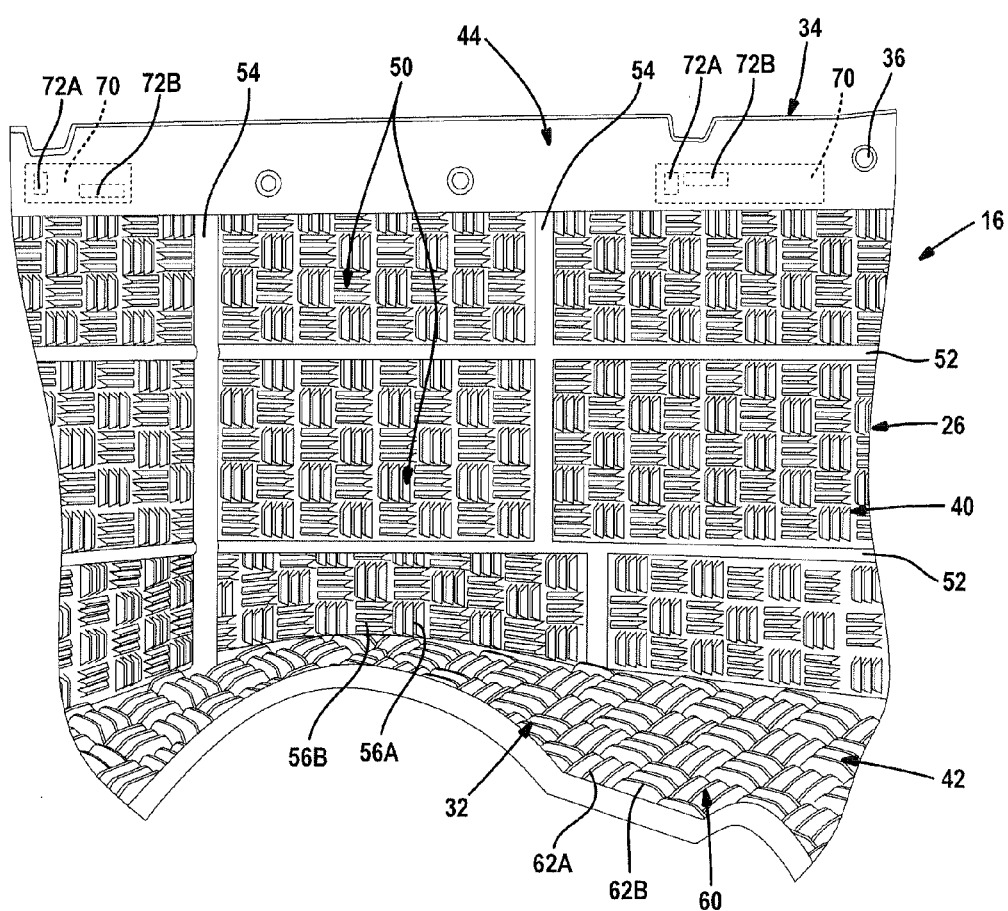
FIG. 4 is an enlarged partial view of FIG. 3 showing the convoluted surface profile of the acoustical sections in greater detail.

In accordance with one aspect of the present teachings, liner 16 may include an inner surface that is formed to include one or more acoustical sections have a surface profile defined by an irregular, hereinafter referred to as a "convoluted" sound attenuating surface. To this end, liner 16 is shown to include an inner wall surface 40 associated with main body portion 26, an inner wall surface 42 associated with inner side flange portion 32, and an inner wall surface 44 associated with outer side flange portion 34. With particular reference to FIGS. 3 and 4, main body portion 26 is shown to include a plurality of acoustical sections 50 that are configured in a "grid" pattern delineated by longitudinal boundaries 52 and lateral boundaries 54 to define generally rectangular acoustical sections 50. Each acoustical section 50 includes a surface profile comprised of a repetitive sequence of irregular surface portions 56A and 56B that are oriented in phased rows and columns to define the convoluted acoustical surfaces in association with inner wall surface 40 of main body portion 26.

As noted, these convoluted noise attenuating surfaces, associated with each acoustical section 50, are formed during the molding process of liner 16. While a continuous arrangement of acoustical sections 50 are shown in association with inner surface 40 of main body portion 26 of liner 16, it will be understood that inner wall surface 40 can also include a combination of non-convoluted (i.e., planar) surfaces interposed between adjacent convoluted surfaces if it is determined that such an arrangement provides enhanced acoustical and/or structural characteristics in a particular vehicular application.

Inner wall surface 42 of inner side flange portion 32 is also shown to include one or more acoustical sections 60. In this particular example, acoustical section 60 is continuous (i.e., not bounded in a grid pattern) and includes a surface profile comprised of a repetitive sequence of irregular portions 62A and 62B that are oriented in phased rows and columns to define the convoluted acoustical surfaces on inner wall surface 42 of inner side flange portion 32. Acoustical section(s) 60 can also be identical to acoustical sections 50 formed on main body portion 26 or, in the alternative, may be configured in a different pattern, phase, or number of irregular portions if desired to provide the required acoustical and structural characteristics.

Inner wall surface 44 of outer side flange portion 34 is shown to be planar and not include any type of acoustical sections having a convoluted inner surface profile. However, inner surface 44 may include a plurality of acoustical sections 70, which are shown schematically in phantom lines. Acoustical sections 70 can include a surface profile comprised of a repetitive sequence of irregular portions 72A and 72B that are oriented in phased rows and columns to define the convoluted acoustical surfaces on inner wall surface 44 of outer side flange portion 34. Acoustical sections 70 can be identical to either of acoustical sections 50 and 60 or, in the alternative, may be configured in a different pattern, phase, number of irregular portions and the like if desired to provide the required acoustical characteristics.

With reference again to FIG. 3, an outer surface 27 of main body section 26 and an outer surface 45 of outer flange portion 34 are shown to be planar. In this configuration, an outer surface 43 of inner flange portion 32 would also be planar. However, those skilled in the art will appreciate that liner 16 can be molded to have a relatively constant wall thickness between each portion's inner and outer surfaces. As such, outer surfaces 27, 43, 45 would be non-planar and form portions of the convoluted acoustical surfaces that correspond to and are formed concurrently with molding of the convoluted acoustical surfaces on the inner surfaces 40, 42, 44. In addition, it is further contemplated that air passage (i.e., holes, slits, slots, etc.) can extend through one or more of main body portion 26 and/or flange portions 32, 34 to assist in attenuating sound via air transfer through liner 16.

Figure 5:
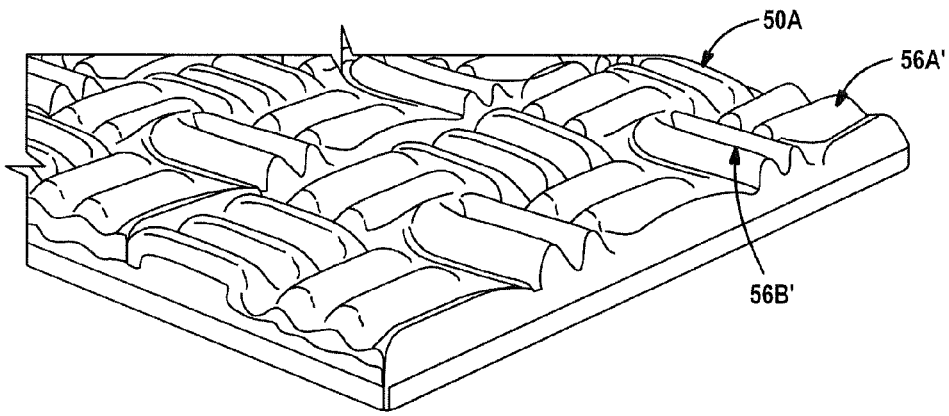
FIGS. 5 through 8 are examples of alternative convoluted surface profiles adapted for use with the acoustical sections of the acoustic wheel well liner and which are configured in accordance with alternative arrangements according to the present disclosure.
Figure 6:
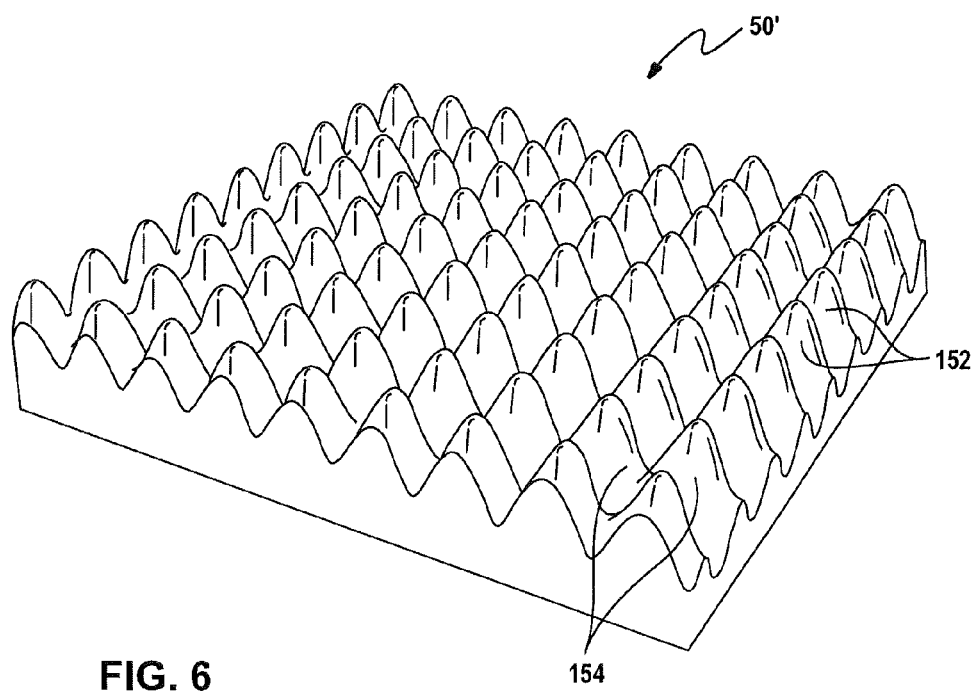
Figure 7:
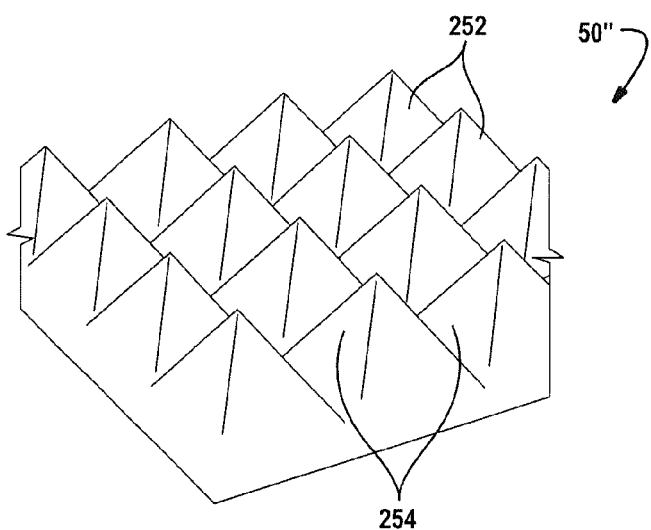
Figure 8:
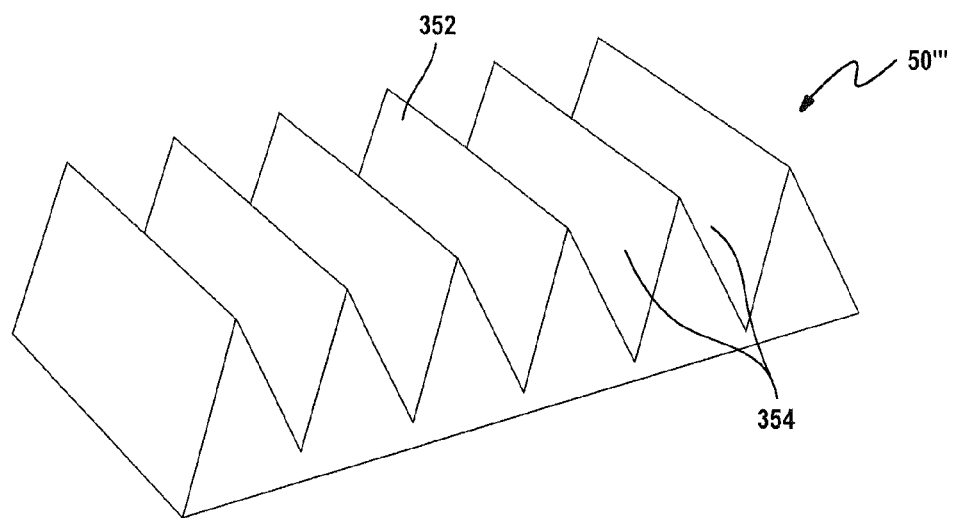

Referring to FIGS. 5-8, exemplary alternative configurations for the irregular convoluted portions of acoustical sections 50, 60, 70 of liner 16 are illustrated. FIG. 5 shows an acoustical section 50A having a continuous pattern of irregular surface portions 56A' and 56B'. FIG. 6 illustrates an acoustical section 50' comprised of aligned rows and columns of commonly shaped irregular portions 152 defining generally conical elements that are connected and separate by generally conical swales 154. FIG. 7 illustrates an acoustical section 50" comprised of aligned rows and columns of commonly shaped irregular portions 252 generally defining right pyramid elements that are connected and separated by generally inverse pyramid swales 254. Finally, FIG. 8 illustrates an acoustical section 50''' comprised of rows of elongated conical elements 352 that are interconnected by rows of elongated conical swales 354 to define the commonly shaped irregular portions. Thus, those skilled in the art will appreciate that any combination of irregular surfaces configured to provide sound absorption and/or noise attenuation in association with wheel well liner 16 can be used to provide acoustical sections that are formed into and extend from one or more of the inner surfaces of the liner. Furthermore, while each of the different acoustical sections 50A, 50', 50" and 50''' shown in FIGS. 5 through 8 is shown to include a planar outer surface, those skilled in the art will recognize that a uniform wall thickness may also be established via the molding process and such acoustical sections are within the scope of this invention.

Figure 9:
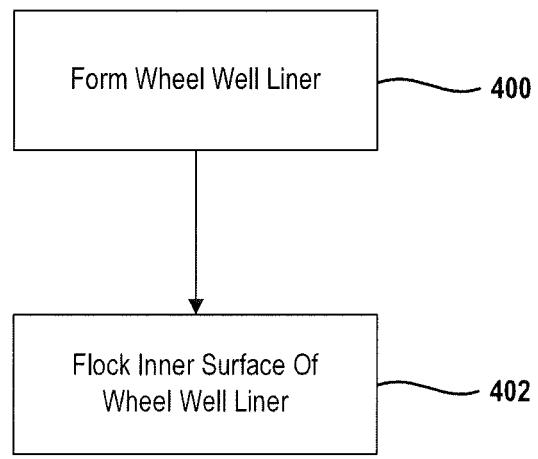
FIG. 9 is a block diagram of the steps associated with a method for providing a textile surface layer by flocking the inner surfaces of the acoustic wheel well liners.

Following, or as part of, fabrication of liner 16, the present disclosure further contemplates the application of a sound absorbing and aesthetic textile product to its inner surfaces. To this end the present disclosure contemplates the application of small fibers via a "flocking" process to one or more of inner surfaces 40, 42 and 44. A method for this flocking operation is shown in the block diagram of FIG. 9 to include a first step 400 required to form liner 16 with its acoustical sections and a second step 402 required to flock the inner surface of liner 16. The flocking process generally includes a method of depositing many small textile fiber particles (i.e., "flock") onto the inner surface of liner 16. The fiber particles can be random cut or precision cut and having a length in the range of about 0.25 mm to two inches. The type of cut and length of the fibers will be selected to provide optimal sound attenuation and enhanced aesthetics. Likewise, the thickness of the flock particles can be selected from a range of about 1.5 to 28 denier to assist in optimized performance.

Flocking of the inner surface of acoustical liner 16 provides several features including supplemental sound attenuation, insulation and low reflectivity as well as enhanced aesthetics and appearance. The fiber particles can have length and thickness dimensions selected for use with liner 16 to withstand to environment to which the inner surfaces of liner 16 are exposed when installed on vehicle 10. The inner surfaces of liner 16 are initially coated with an adhesive and then the fibers are applied thereto, typically via application of an electric field. Preferably, the flock is finely cut synthetic monofilament fibers such as, for example, nylon, raylon or polyester. The electric field causes the fibers to be electrically charged such that the fibers are propelled and anchored at generally right angles to the adhesive layer. Alternatively, the fibers could be applied to the polymeric material in the mold, during the molding process. However, other known processes for applying flock to the inner surfaces of liner 16 can also be utilized such as, for example, electrostatic, vibration and spraying techniques.

Figure 10:
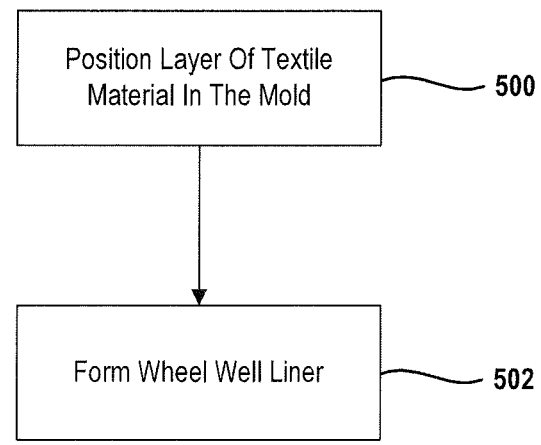
FIG. 10 is a block diagram of steps associated with an alternative method for providing a textile surface layer to the inner surfaces of the acoustic wheel well liners.

As an alternative to the flocking process (FIG. 9) in which the textile material is deposited after fabrication of acoustic liner 16, FIG. 10 illustrates, in block format, a method for laminating a layer of a textile material to liner 16 during the fabrication process. Specifically, first step 500 requires that a layer, film or sheet of textile material is laid into the mold prior to the forming operation. Second step 502 indicates the forming step in which wheel liner 16 is fabricated, preferably using a low pressure injection molding process with the polymeric material injected into the mold containing the layer, film or sheet of textile material.

Figure 11:
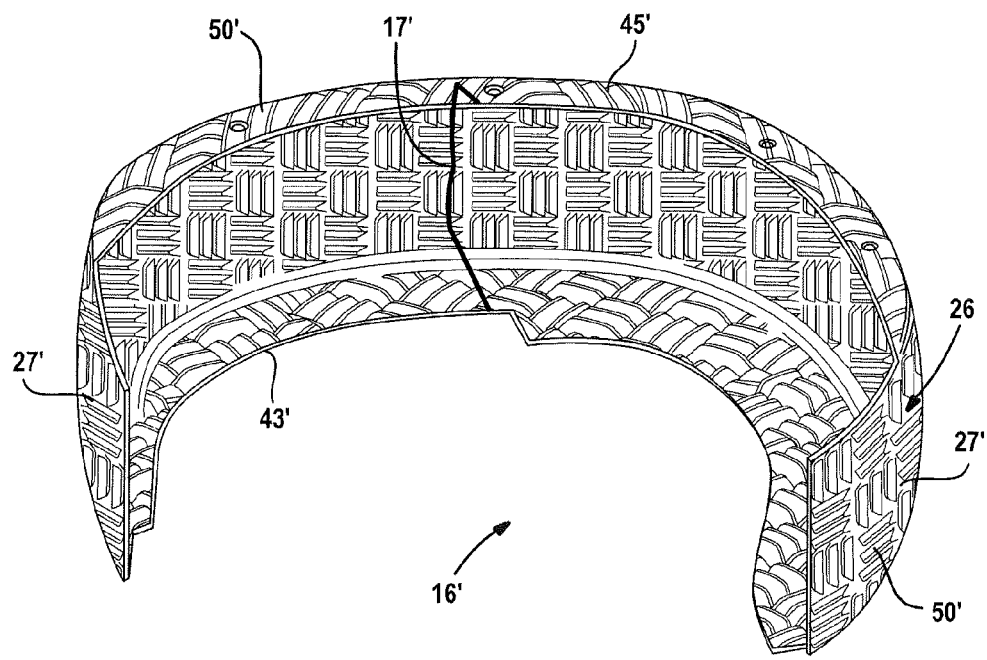
FIG. 11 is a prospective view of an acoustic wheel well liner, generally similar to FIG. 3, but illustrating an alternative construction associated with the present disclosure.
Figure 12:
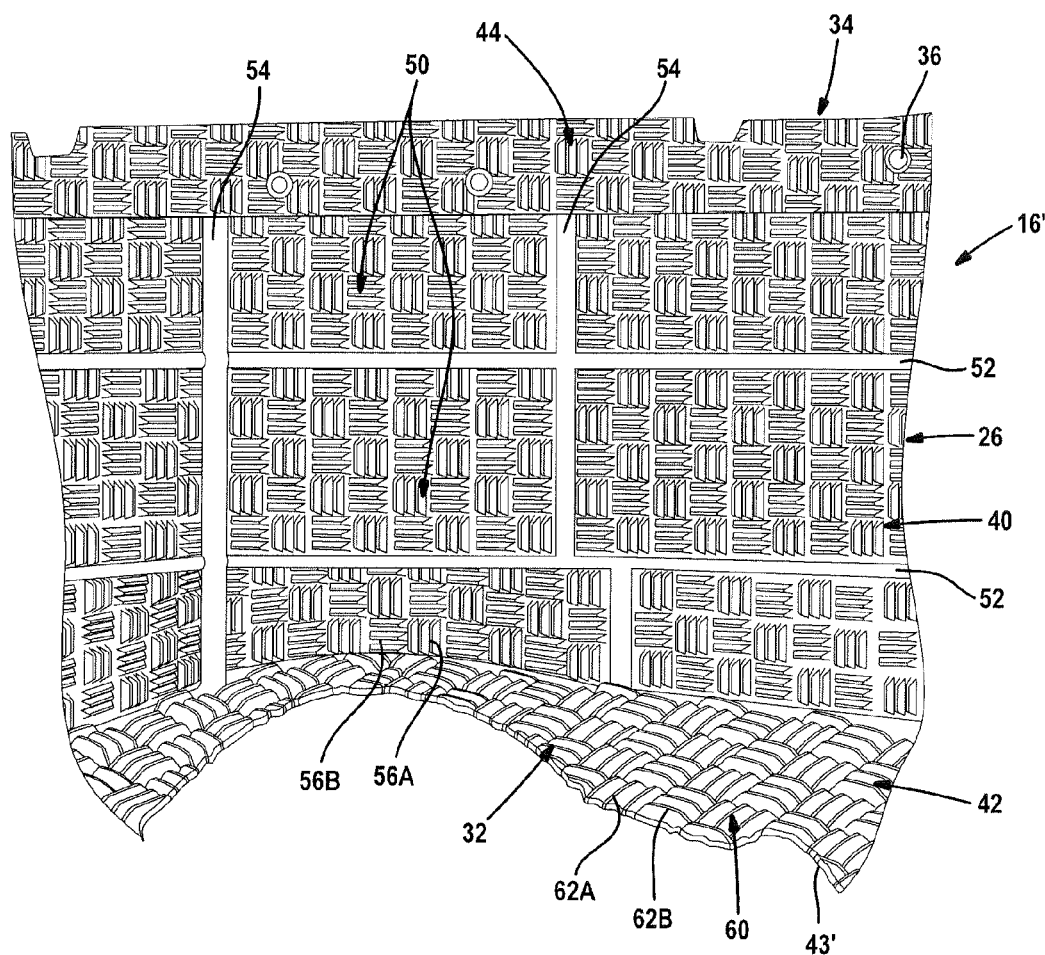
FIG. 12 is an enlarged partial view of FIG. 11.

Referring now to FIGS. 11 and 12, a slightly revised version of acoustic liner 16 is shown and identified as acoustic liner 16'. In general, acoustic liner 16' is similar to acoustic liner 16 except that a generally uniform wall thickness is now illustrated. In accordance with a non-limiting example, the thickness of liner 16' is in the range of 2 to 5 mm and preferably about 3.5 mm Specifically, outer surface 27' of main body portion 40 is now shown to include acoustical sections 50' formed concurrently with acoustical sections 50. The outer surface 43' of inner flange portion 32 and the outer surface 45' of outer flange portion 34 also include the acoustical sections 50 formed concurrently with acoustical sections 50. While forming acoustic liner 16 having a generally common wall thickness was described in relation to FIGS. 3 and 4, these additional illustrations provide further clarity and support to preferred alternative configurations. It is also contemplated that different wall thickness dimensions can be provided for one or more of main body portion 26 and side flange portions 32, 34 so as to provide the required rigidity. The liner 16' shown in FIG. 12 includes a constant wall thickness between the inner surface 42 and the outer surface 43' of the inner flange 32. In this embodiment, the wall thickness is constant along the length of the liner 16' from one end section 28 to the opposite end section 30. FIG. 12 also shows an example of inner and outer surfaces 42, 43' having the same profile. This liner 16' also includes the constant wall thickness and the matching inner and outer surface profiles along the main body portion 26 and along the outer flange 34, in addition to the inner flange 32.

An additional feature shown in association with acoustic liner 16' is the inclusion of a continuous hinge interface, hereinafter referred to as living hinge 17', extending completely across both side flange portions 32, 34 and main body portion 26. The living hinge 17' is typically formed in the polymeric material during the molding, back forming, or compression sheet forming process. When the liner 16' includes the living hinge 17', the main body portion 26 of the liner 16' includes a first body section and a second body section disposed on opposites sides of the hinge 17', the inner surface 40 of the first body section presents an arcuate shape extending from the first end section 28 to the hinge 17', and the inner surface 40 of the second body section also presents an arcuate shape extending from the hinge 17' to the second end section 30.

Living hinge 17' is configured to facilitate removal of liner 16' from the mold following the molding process and avoid a die lock situation. Living hinge 17' also facilitates stacking of a plurality of liners 16' so as to provide improved post-fabrication material handling and transport. Living hinge 17' further facilitates post-fabrication flocking of the inner surfaces. The location of living hinge 17' is shown generally centrally positioned in liner 16' in the non-limiting example shown.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wheel well liner for installation in a wheel well of a motor vehicle, comprising:
a main body portion presenting an inner surface for facing a wheel and an outer surface for facing a wheel well, said main body portion including a continuous piece of material extending between opposite end sections, and said continuous piece of material including a hinge located between the opposite end sections;
said inner surface and said outer surface of said main body portion each including at least one acoustical section presenting a non-planar profile for attenuating sound.

2. The wheel well liner of claim 1, wherein said main body portion is formed of polymeric material, and said hinge is a living hinge formed in said polymeric material.

3. The wheel well liner of claim 1, wherein said main body portion includes a first body section and a second body section disposed on opposites sides of said hinge, said inner surface of said first body section presents an arcuate shape extending from a first one of said end sections to said hinge, and said inner surface of said second body section presents an arcuate shape extending from said hinge to a second one of said end sections.

4. The wheel well liner of claim 1, wherein said main body presents a thickness between said inner surface and said outer surface, and said thickness is constant from a first end section to a second end section of said main body portion.

5. The wheel well liner of claim 1, wherein said non-planar profile along said inner surface matches said non-planar profile along said outer surface.

6. The wheel well liner of claim 5, wherein said main body presents a thickness between said inner surface and said outer surface, and said thickness is constant from a first end section to a second end section of said main body portion.

7. The wheel well liner of claim 1, wherein said liner includes an inner flange portion and an outer flange portion, each of said flange portions present an inner surface for facing a wheel and an outer surface for facing a wheel housing or a fender panel, and said inner and outer surfaces of said flange portions each include at least one acoustical section presenting a non-planar profile for attenuating sound.

8. The wheel well liner of claim 1, wherein said inner surface includes a plurality of said acoustical sections, and said non-planar profiles of said acoustical sections include aligned rows and columns of non-planar shapes.

9. The wheel well liner of claim 1 including a plurality of fiber particles disposed on said inner surface of said main body portion.

10. The wheel well liner of claim 9, wherein said main body portion is formed of at least one of polypropylene and polyethylene, and said fiber particles are formed of at least one of nylon, rayon, and polyester.

11. The wheel well liner of claim 9, wherein said fiber particles have a length of 0.25 mm to 2 inches, and at least some of said fiber particles are disposed at a right angle to said inner surface.

12. The wheel well liner of claim 1 including a textile material disposed on said inner surface of said main body portion.

13. A method of manufacturing a wheel well liner, comprising the steps of:
providing a main body portion presenting an inner surface and an outer surface,
forming at least one acoustical section having a non-planar profile along the inner surface, and
forming at least one acoustical section having a non-planar profile along the outer surface of the main body portion,
wherein the step of providing the main body portion with the acoustical sections includes molding, back forming, or compression sheet forming.

14. The method of claim 13 including applying a plurality of fiber particles or a textile material to the inner surface of the main body portion.

15. The method of claim 14 including laying the textile material in a mold, and applying a polymeric material to the textile material in the mold to form the main body portion.

16. The method of claim 13, wherein the step of providing the main body portion includes injection molding a polymeric material.

17. The method of claim 13 including forming a hinge between end sections of the main body portion during the molding, back forming, or compression sheet forming step.

18. The method of claim 13, wherein the step of providing the main body portion includes forming matching non-planar profiles along the inner and outer surfaces, and forming a constant thickness between the inner and outer surface, wherein the constant thickness extends between opposite end sections of the main body portion.

\* \* \* \* \*